United States Patent [19]

Bottomley et al.

[11] Patent Number: 5,577,068
[45] Date of Patent: Nov. 19, 1996

[54] GENERALIZED DIRECT UPDATE VITERBI EQUALIZER

[75] Inventors: Gregory E. Bottomley, Cary, N.C.; Sandeep Chennakeshu, Schenectady, N.Y.; Paul W. Dent, Stehag, Sweden; R. David Koilpillai, Cary, N.C.

[73] Assignee: Ericsson GE Mobile Communications Inc., Research Triangle Park, N.C.

[21] Appl. No.: 274,727

[22] Filed: Jul. 18, 1994

Related U.S. Application Data

[63] Continuation-in-part of Ser. No. 894,933, Jun. 8, 1992, Pat. No. 5,331,666.
[51] Int. Cl.$^6$ .............................. H04B 1/10; H04L 27/01
[52] U.S. Cl. ...................... 375/232; 375/348; 364/724.2
[58] Field of Search ........................ 364/724.2; 375/101, 375/348, 232

[56] References Cited

U.S. PATENT DOCUMENTS

| | | | |
|---|---|---|---|
| 3,969,674 | 7/1976 | Tracey | 364/724.2 |
| 5,031,193 | 7/1991 | Atkinson et al. | 375/231 |
| 5,099,499 | 3/1992 | Hammar | . |
| 5,164,961 | 11/1992 | Gudmundson | . |
| 5,182,749 | 1/1993 | Kazecki et al. | . |
| 5,191,598 | 3/1993 | Bäckström et al. | . |
| 5,285,480 | 2/1994 | Chennakeshu et al. | 375/348 |
| 5,297,169 | 3/1994 | Bäckström et al. | 375/101 |
| 5,331,666 | 7/1994 | Dent | 375/341 |
| 5,335,250 | 8/1994 | Dent et al. | 375/224 |
| 5,440,588 | 8/1995 | Murakami | 375/348 |

FOREIGN PATENT DOCUMENTS

| | | |
|---|---|---|
| 545159 | 6/1993 | European Pat. Off. |
| 3730394 | 3/1989 | Germany |
| 4310031 | 9/1994 | Germany |
| WO92/08298 | 5/1992 | WIPO |

OTHER PUBLICATIONS

Y. Kamio et al, "Performance of Reduced Complexity DFE Using Bidirectional Equalization in Land Mobile Communication", *Proc. 42nd IEEE Veh. Tech. Conf.*, Denver, CO 1992, pp. 372–375.

Y. J. Liu et al, "A Soft–Output Bidirectional Decision Feedback Equalization Technique for TDMA Cellular Radio", *IEEE J. Sel. Areas Commun.*, vol. 11, pp. 1034–1045, Sep. 1993.

H. Suzuki, "Performance of a New Adaptive Diversity–equalization for Digital Mobile Radio", *Electron Lett.*, vol. 26, pp. 626–627, 1990.

J. G. Proakis, *Digital Communications*, 1nd Ed., New York: McGraw-Hill, Chapter 6, 1989.

C. M. Rader, "Memory Management in a Viterbi Decoder", *IEEE Trans. Commun.*, vol. COM–29, pp. 1399–1401, Sep. 1981.

L. Lindbolm, "Adaptive Equalization for Fading Mobile Radio Channels", *Licentiate Thesis*, Chap. 4, Dept. of Technology, Uppsala University, Sweden, Nov. 1992.

A. P. Clark et al, "Adaptive Channel Estimator for an HF Radio Link", *IEEE Trans. Commun.* vol. 37, pp. 918–196, Sep. 1989.

N. Seshadri, "Joint Data and Channel Estimation Using Fast Blind Trellis Search Techniques", *IEEE*, 1990.

*Primary Examiner*—Stephen Chin
*Assistant Examiner*—Jeffrey W. Gluck
*Attorney, Agent, or Firm*—Burns, Doane, Swecker & Mathis, L.L.P.

[57] ABSTRACT

A radio receiver for demodulating and equalizing digital information is disclosed. The receiver receives radio signals and processes the signals to produce data samples which are then stored. Reference values that model what the receiver should receive for various transmitted symbol sequence hypotheses are also stored. The receiver equalizes the received data using the stored reference values to produce symbol detection information, and updates the reference values based on the symbol detection information.

14 Claims, 2 Drawing Sheets

5,577,068

GENERALIZED DIRECT UPDATE VITERBI EQUALIZER

This is a continuation-in-part application of allowed U.S. patent application Ser. No. 07/894,933 filed Jun. 3, 1992 now U.S. Pat. No. 5,331,666.

FIELD OF THE PRESENT INVENTION

The invention relates to the demodulation and equalization of digitally modulated radio signals that have passed through a time varying channel.

BACKGROUND OF THE INVENTION

Digital wireless communication systems are used to convey a variety of information between multiple locations. With digital communications, information is translated into a digital or binary form, referred to as bits, for communications purposes. The transmitter maps this bit stream into a modulated symbol stream, which is detected at the digital receiver and mapped back into bits and information.

In digital wireless communications, the radio environment presents many difficulties that impede successful communications. One difficulty is that the signal level can fade because the signal may travel multiple paths due to being reflected that cause signal images to arrive at the receiver antenna out of phase. This type of fading is commonly referred to as Rayleigh fading or fast fading. When the signal fades, the signal-to-noise ratio becomes lower, causing degradation in the quality of the communication link.

A second problem occurs when the multiple signal paths are much different in length. In this case, time dispersion occurs, in which multiple fading signal images arrive at the receiver antenna at different times, thus giving rise to signal echoes or rays. This causes intersymbol interference (ISI), where the echoes of one symbol interfere with subsequent symbols.

At the receiver, coherent demodulation is desirable, since it provides the best performance. This requires knowledge of the multipath channel. In many wireless applications, this channel is time varying, due to transmitter motion, receiver motion, and/or scatterer motion. Thus, there is a need to track a time varying multipath channel, To provide coherent demodulation of multipath signals, a maximum-likelihood-sequence-estimation (MLSE) equalizer may be employed. Such an equalizer considers various hypotheses for the transmitted symbol sequence, and, with a model of the dispersive channel, determines which hypothesis best fits the received data. This is efficiently realized using the Viterbi algorithm. This equalization technique is well known to those skilled in the art, and can be found in standard textbooks such as J. G. Proakis, *Digital Communications*, 2nd ed., New York: McGraw-Hill, chapter 6, 1989.

The conventional MLSE equalizer can be explained by a simple example. Suppose the transmitter transmits a symbol stream s(n), which takes on +1 or −1 values corresponding to bit values 0 and 1 respectively. This stream is modulated using binary phase-shift keying (BPSK). At the receiver, the received signal is filtered, amplified, and mixed down using I and Q carriers, then sampled once every symbol period (T), giving a received signal stream r(n). In this example, the intervening channel consists of two fading rays, a main ray and an echo, where the echo arrives T seconds later. Then, the received signal can be modeled as:

$$r(n) = c_0^* s(n) + c_1^* s(n-1) + n(n) \qquad (1)$$

where $c_0$ and $c_1$ are complex channel tap values and $n(n)$ is additive noise or interference. The superscript "*" denotes the complex conjugate.

In the MLSE equalizer, at iteration n, there would be two different previous "states", 0 and 1, corresponding to the two possible values for $s(n-1)$, +1(0) and −1(1). Associated with each previous state would be an accumulated metric, accumulated from previous iterations, giving rise to accumulated metrics $A_0(n-1)$ and $A_1(n-1)$. There would also be two current states, corresponding to the two possible values for $s(n)$. Each possible pairing of a previous state with a current state corresponds to a hypothetical sequence $\{s_h(n-1), s_h(n)\}$. For each hypothesis, the predicted received signal value would be:

$$r_h(n) = c_0^* s_h(n) + c_1^* s_h(n-1) \qquad (2)$$

The corresponding "branch" metric would be given by $$M_h(n) = |r(n) - r_h(n)|^2 \qquad (3)$$

The candidate metric for a current state would be the sum of the branch metric and the previously accumulated metric associated with $s_h(n-1)$. For each current state, there are two possible previous states. For each current state, the previous state which gives the smallest candidate metric is selected as the predecessor state, and the candidate metric becomes the accumulated metric for that current state.

Thus, for current state 0, there would be two hypothetical sequences $\{+1, +1\}$ and $\{-1, +1\}$, referred to as hypotheses h=00 and h=10. This gives rise to two candidate metrics:

$$C_{00}(n) = A_0(n-1) + M_{00}(n) \qquad (4a)$$

$$C_{10}(n) = A_1(n-1) + M_{10}(n) \qquad (4b)$$

The smaller of these two candidate metrics gives the accumulated metric for current state 0. The corresponding previous state becomes the predecessor state to state 0 at time n. If $C_{10}(n) < C_{00}(n)$, then the accumulated metric for current state 0 at time n becomes:

$$A_0(n) = C_{10}(n) \qquad (5)$$

The predecessor state and its predecessor and so forth is referred to as the path history of the current state. A similar procedure is applied to current state 1, in which case the two hypotheses are h=01 and h=11.

The detected symbols are decided by one of two methods. In the first method, all of the data are processed first. Then, the final state with the best metric is determined. The path history of this state gives the detected or demodulated data. In the second method, detection decisions are made before all of the data are processed. At time n, the symbol transmitted at time n−τ is decided, where τ is referred to as the decision depth. This is performed by finding the state at time n with the best metric and using its path history to determine the detected symbol at time n−τ.

In general, the time varying channel consists of a number of channel taps that vary with time no After filtering, mixing down to baseband, and sampling, the received data samples r(n) can be modeled as:

$$r(n)=c_0^*(n)s(n)+c_1^*(n)s(n-1)+\ldots+n(n) \quad (6)$$

where s(n) are the transmitted symbols, $c_i(n)$ are the time dispersive channel taps, and n(n) is additive noise. It is convenient to use vector notation and to express the received data sample as:

$$r(n)=c^H(n)x(n)+n(n) \quad (7)$$

where c(n) is a vector of channel taps and x(n) is a vector containing the current and past transmitted symbols. The superscript "H" denotes the conjugate transpose.

The demodulator relies on channel tap estimates, $C_{est}(n)$, to predict received values for various hypothetical symbol sequences $x_h(n)$. These predicted values, referred to as target values $t_h(n)$, are given by:

$$t_h(n)=c_{est}^H(n)\, x_h(n) \quad (8)$$

The target values are used to form branch metrics given by, for example, $$M_h(n)=|r(n)-t_h(n)|^2 \quad (9)$$

or some equivalent metric. These metrics are accumulated and used to determine the demodulated symbol sequence.

The channel tap estimates must be updated to track a time-varying channel. This is done by making a tentative decision as to what symbols were transmitted up to time n, giving $s_{det}(n)$, $s_{det}(n-1)$ ... which can be put into a vector $x_{det}(n)$. Typically, an error signal e(n) is used to update the channel tap estimates, where the error signal is given by the difference in what was received and what was predicted, i.e., $$e(n)=r(n)-c_{est}^H(n)\, x_{det}(n) \quad (10)$$

Once the channel taps have been updated, giving $c_{est}(n+1)$, the channel taps can be used to form new predictions $t_h(n+1)$.

Thus, tracking the channel and forming target values involves the following steps. First, an initial detection decision is made. Then a target value is formed by filtering the detected data. An error signal is then formed by comparing the received and target values. The error is then used to update the channel tap estimates. Finally, the channel tap estimates are used to form updated target values. Each of these steps requires hardware or software resources which contributes to the complexity of the demodulator. Thus, there is a need to reduce this complexity without losing performance.

SUMMARY OF THE DISCLOSURE

It is an object of the present invention to provide a balance between tracking performance, complexity, and modeling. This is accomplished in the present invention by directly updating the target values, rather than updating channel tap values and using these to update the target values. By using symmetry properties, only a subset of target values, referred to as reference values, need to be stored and updated. Furthermore, the present invention provides the flexibility of updating any or all of the reference target values.

According to one embodiment of the present invention, a single set of reference values are updated corresponding to a single channel model. According to another embodiment of the present invention, there is a set of reference values for each state in the equalizer, corresponding to a channel model per state.

According to one embodiment of the present invention, a radio receiver for demodulating digital information is disclosed. The receiver comprises means for receiving radio signals and processing them to produce data samples, and means for storing the data samples. Means for storing reference values that model what the receiver should receive for various transmitted symbol sequence hypotheses are also provided. The receiver also comprises means for equalizing the received data using the stored reference values to produce symbol detection information, and means for updating the reference values based on the symbol detection information.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION OF THE DISCLOSURE

While the present invention will be described using several specific modulation formats, it will be understood by those skilled in the art that the present invention can be applied to other modulation schemes.

In general, the form for updating the reference values depends on the implicit channel tracking algorithm. In the most general case, there are channel tracking parameters or quantities, which may include channel tap estimates, channel tap derivative estimates, Doppler frequency estimates, etc., that can be stored in a vector, $Q_c$. These parameters are updated all or in part using some mapping F and some information, stored in vector D(n), which may include current channel tracking parameters, detected values, signal-to-noise ratio estimates, etc. Thus, the channel tracking parameters are updated according to:

$$Q_c(n+1)=F(D(n)) \quad (11)$$

The new channel tracking parameters are then used to predict received data based on some mapping G, so that:

$$t_h(n+1)=G(Q_c(n+1)) \quad (12)$$

Mapping F can be viewed as a function that relates the information D(n) to the updated channel tracking parameters $Q_c(n+1)$. For example, D(n) could include the current channel tracking parameters $Q_c(n)$ and an estimate of how the parameters have changed, $\Delta_c(n)$. Then, the mapping F could be given by:

$$Q_c(n+1)=F(D(n))=Q_c(n)+\Delta_c(n)$$

Similarly, mapping G is a function relating the updated tracking parameters to the updated target value. Suppose the tracking parameters $Q_c(n+1)$ include channel tap estimates $c_{0,est}(n+1)$ and $c_{1,est}(n+1)$. Then the mapping G could be given by:

$$t_h(n+1)=G(Q_c(n+1))=c_{0,est}^*(n+1)\, s_h(n+1)+c_{1,est}^*(n+1)\, s_h(n)$$

Traditionally, mapping F is applied first, then mapping G.

With the present invention, the target values or some subset of them are updated directly. This is possible because the target values can be expressed directly in terms of the information:

$$t_h(n+1)=G(F(D(n)))=H(D(n)) \tag{13}$$

where H is the composite mapping of F and G. The information in vector $D(n)$ can usually be expressed in terms of current target values and possibly some auxiliary quantities. One embodiment of the present invention provides an example in which the auxiliary quantities correspond to target value derivative estimates.

In some applications, it may be desirable to update only a subset of the target values. This can be achieved by applying the direct update approach to only those reference values that are to be updated. By allowing only partial updating, it may be possible to equalize nonlinear channels, which arise, for example, when nonlinearities exist in the receiver front-end processing.

The present invention can also be applied when equalization is unnecessary, in which case a direct update demodulator is obtained. In this case, the target values correspond to single symbol hypotheses. Symmetry may be used to reduce the number of target values stored and updated.

Figure 1:
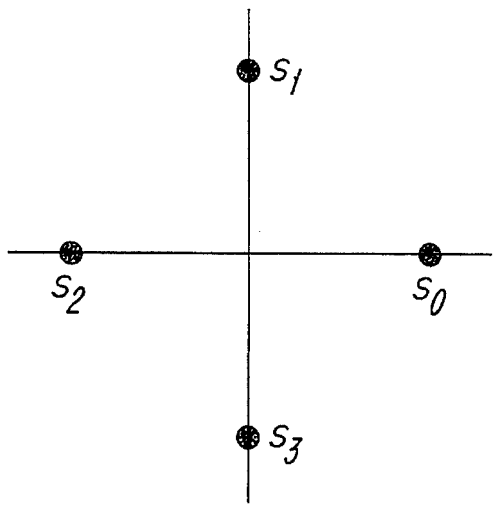
FIG. 1 illustrates a signal constellation according to one embodiment of the present invention.

One embodiment of the present invention is configured for a four-level modulation such as QPSK or DQPSK. The present invention is also applicable to $\pi/4$ shift DQPSK, since the received data samples can be processed so as to remove the $\pi/4$-shift. For these signals, the k'th possible symbol is given by $s_k=e^{j\pi k/2}$ so that the four possible transmitted symbols are $s_0=+1$, $s_1=+j$, $s_2=-1$, and $s_3=-j$, which are shown in FIG. 1. If differential modulation is used, then the information can be extracted from knowledge of successive symbols.

The implicit channel tracking algorithm is given in U.S. patent application Ser. No. 07/942,270, which is incorporated herein by reference. The tracker tracks estimates of the channel taps and their derivatives, i.e., how the channel taps change with time. Assuming only two signal rays are received, a main ray and an echo, the tracker updates channel tap estimates ($c_{0,est}$ and $c_{1,est}$) and derivative estimates ($d_{0,est}$ and $d_{1,est}$) according to:

$$e(n)=r(n)-c_{0,est}^*(n)s_{est}(n)-c_{1,est}^*(n)s_{est}(n-1) \tag{14a}$$

$$d_{0,est}(n+1)=d_{0,est}(n)+\epsilon_0 e^*(n)s_{est}(n) \tag{14b}$$

$$d_{1,est}(n+1)=d_{1,est}(n)+\epsilon_1 e^*(n)s_{est}(n-1) \tag{14c}$$

$$c_{0,est}(n+1)=c_{0,est}(n)+d_{0,est}(n+1)+\mu_0 e^*(n)s_{est}(n) \tag{14d}$$

$$c_{1,est}(n+1)=c_{1,est}(n)+d_{1,est}(n+1)+\mu_1 e^*(n)s_{est}(n-1) \tag{14e}$$

where $\mu_k$ and $\epsilon_k$ denote the real (not complex) least mean square (LMS) step sizes, superscript "*" denotes complex conjugate, $r(n)$ is the received data, and $s_{est}(n)$ and $s_{est}(n-1)$ are the estimated data symbols. These could be known or detected symbols.

In one embodiment of the present invention, there is a single channel model, which implies a single set of reference target values. There are four such reference values: $Z_{00}$, $Z_{01}$, $Z_{02}$ and $Z_{03}$, where $Z_{ab}$ is the target value for the hypothesis that $s(n)=s_b$ and $s(n-1)=s_a$. A target value for an arbitrary hypothesis can be determined from the reference target values according to:

$$Z_{ab}=Z_{0m}e^{j\pi a/2} \tag{15}$$

where $$m=(b+3a) \bmod 4 \tag{16}$$

There are also four reference delta values: $D_{00}$, $D_{01}$, $D_{02}$ and $D_{03}$. The reference delta values give an estimate for how the target value is changing with time from one update to the next, and are similar to the derivative estimates. Equations 15 and 16 also apply to the reference delta values.

To track the time varying channel, tentative decisions as to what was sent must be made so that an error signal can be generated for the channel tracker. To make these decisions reliable, there is a delay between the time the data are received and the time a tentative decision is made. Thus, at time n, the reference target and delta values correspond to time $n-d$, where d denotes the delay. However, these can be used to form predicted reference target values corresponding to time n. This is done by adding the correct number of reference delta values to the reference target values, i.e., $$Z_{0m}^{pred}(n)=Z_{0m}(n-d)+d\, D_{0m}(n-d) \tag{17}$$

Figure 2:
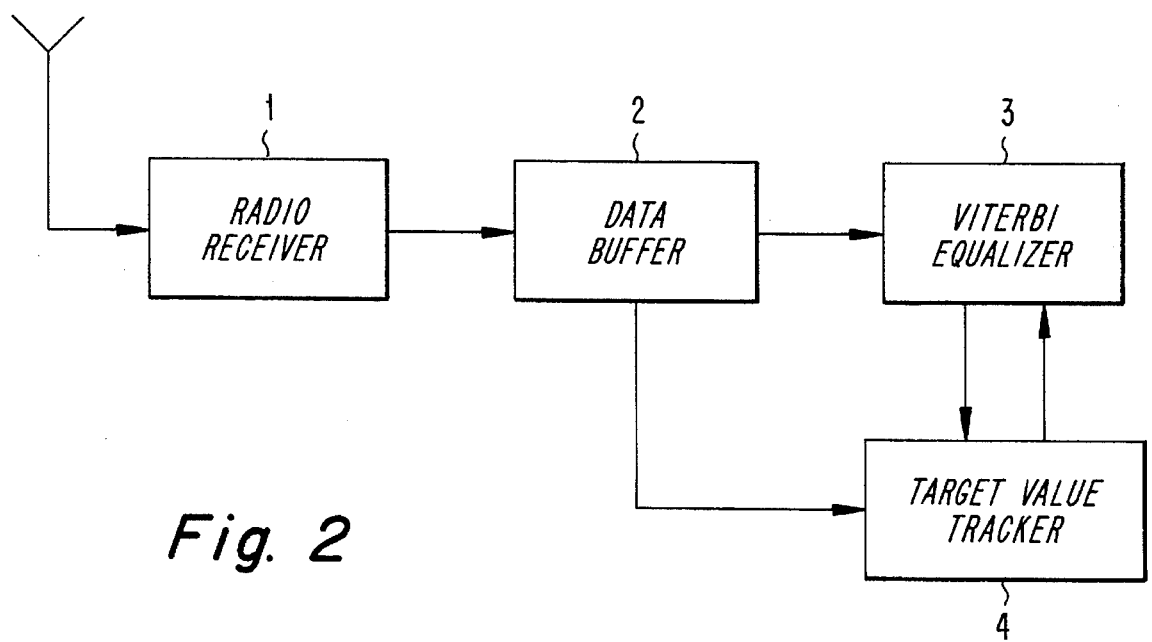
FIG. 2 illustrates a block diagram according to one embodiment of the present invention.

A block diagram of the equalization and target updating processes is given in FIG. 2. A radio receiver 1 receives a radio signal and processes it by, for example, filtering, amplifying and mixing it so as to produce I and Q sampled data, which gives complex data samples. These data samples are stored in a data buffer 2. The Viterbi equalizer 3 processes received samples using the Viterbi equalization approach and using reference target values provided by the target value tracker 4. The target value tracker 4 receives initial detection information from the Viterbi equalizer 3 as well as data values from the buffer 2 for use in updating the reference target values, which are then provided to the Viterbi equalizer 3. Note, however, that the error signal used by the target value tracker may be provided by the equalizer, in which case the tracker does not require data values from the data buffer.

More specifically, equalization of the n'th received sample proceeds according to the following steps. Using predicted reference target values, metrics are formed and used in the Viterbi equalizer. This involves forming candidate metrics by adding existing accumulated metrics with branch metrics. These branch metrics have the form:

$$M_{ab}(n)=|r(n)-Z_{ab}^{pred}(n)|^2=|r(n)-Z_{0m}^{pred}(n)e^{j\pi a/2}|^2=|e^{-j\pi a/2}r(n)-Z_{0m}^{pred}(n)|^2 \tag{18}$$

For each updated state, the best candidate metric is kept.

Then, the updated state with the best accumulated metric is determined. The symbol history of the updated state is used to make a tentative decision concerning symbol $s(n-d)$ and symbol $s(n-d-1)$. These decided values are denoted as $s_k$ and $s_p$ respectively.

A rotated error signal $e_{rot}(n-d)$ is then formed by rotating the received value at that time and subtracting the corresponding reference value. This can be computed a number of ways, one of which is given as:

$$e_{rot}(n-d)=e^{-j\pi p/2}e(n-d)=e^{-j\pi p/2}(r(n-d)-Z_{pk}(n-d))=e^{-j\pi p/2}(r(n-d)-Z_{0M}(n-d)e^{j\pi p/2})=e^{-j\pi p/2}r(n-d)-Z_{0M}(n-d) \quad (19)$$

where $M=(k+3p) \bmod 4$ as in equation 16 and subscript 0M denotes the reference value that corresponds to the tentatively decided data.

Next, all or some subset of the reference values are updated, using forms like:

$$D_{0m}(n-d+1)=D_{0m}(n-d)+f(m,M)e_{rot}(n-d) \quad (20a)$$

$$Z_{0m}(n-d+1)=Z_{0m}(n-d)+D_{0m}(n-d+1)+g(m,M)e_{rot}(n-d) \quad (20b)$$

where $$f(m,M)=\epsilon_1+e^{j\pi(m-M)/2}\epsilon_0 \quad (20c)$$

$$g(m,M)=\mu_1+e^{j\pi(m-M)/2}\mu_0 \quad (20d)$$

The values $\mu_0$ and $\mu_1$ are the step sizes that would have been used in a conventional channel tracker for updating the channel taps. Similarly, the values $\epsilon_0$ and $\epsilon_1$ are the step sizes that would have been used in a channel tracker for updating the derivatives of the channel taps. Finally, predicted references are formed for time $n+1$:

$$Z_{0m}^{pred}(n+1)=Z_{0m}(n-d+1)+d\,D_{0m}(n-d+1) \quad (21)$$

Figure 3:
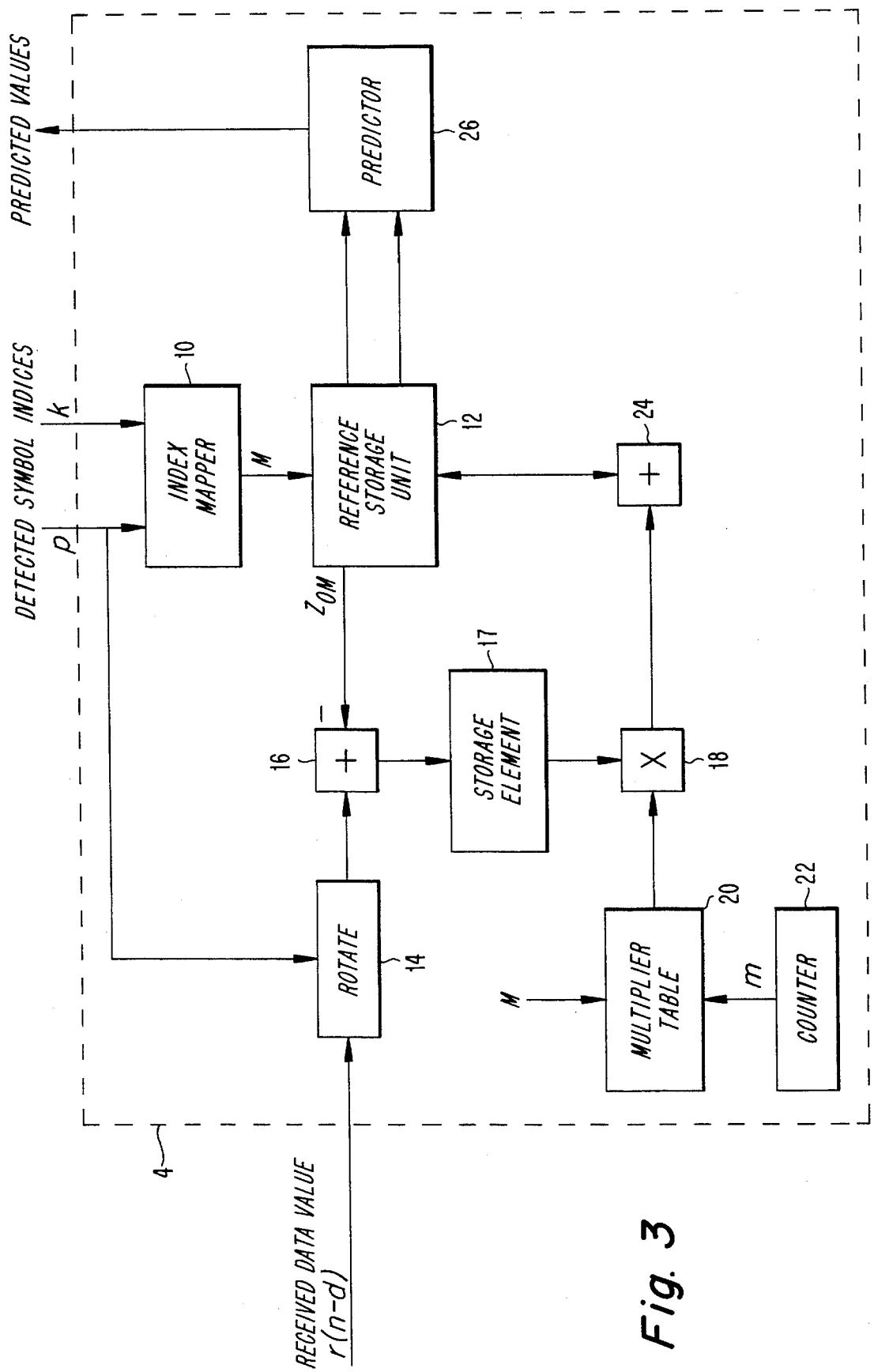
FIG. 3 illustrates a block diagram of the target value tracker according to one embodiment of the present invention.

A detailed block diagram of the target value tracker is given in FIG. 3. The Viterbi equalizer 3 (see FIG. 2) provides indices p and k that indicate the symbols detected at times $n-d-1$ and $n-d$ respectively. An index mapper 10 uses the relation given in equation 16, where $a=p$ and $b=k$, to determine the index M. This index is used to extract $Z_{0M}$ from the reference storage unit 12. Index p from the Viterbi equalizer is also used to rotate a received data value, provided by the data buffer 2 (see FIG. 2), according to equation 19. In an adder 16, the difference between the rotated data value and the extracted reference value is used to form rotated error signal $e_{rot}(n-d)$, which is stored in a storage element 17.

Updating then occurs by counting through the references to be updated and performing the update operation. A counter 22 sequences through the different reference value indices m. For each value of m, two update operations are performed. First, multiplier $f(m,M)$ is extracted from a multiplier table 20 which stores $f(m,M)$ and $g(m,M)$ values for all possible values of m and M (see equations 20c and 20d). This multiplier is used in the multiplier 18 to multiply the rotated error signal stored in the storage element 17. The product is used to update $Z_{0m}$ in an adder 24. Second, the multiplier $g(m,M)$ is extracted from the multiplier table 20 and is used in the multiplier 18 to multiply the rotated error signal stored in storage element 17. The product is used to update $D_{0m}$ in the adder 24.

After all the reference values have been updated and stored in the reference storage unit 12, then the predicted reference values are computed in a predictor 26 according to equation 21. These predicted values are passed back to the Viterbi equalizer 3 for use in the next equalization step.

Many variations of the present invention are possible, which allow for complexity reduction or performance improvement. Some of these variations will be discussed below.

In the first step, which occurs in the Viterbi equalizer 3, the branch metric can be expanded, as illustrated in equation 22, so that computational savings are possible when computing all branch metrics together.

$$M_{ab}(n)=|r(n)|^2-2Re\{e^{j\pi a/2}r^*(n)Z_{0m}^{pred}(n)\}+|Z_{0m}^{pred}(n)|^2 \quad (22)$$

Scaling all metrics by ½ does not change performance. Also, the received data and the predicted target values can be expressed in terms of I and Q components:

$$r(n)=I+jQ \quad (23a)$$

$$Z_{0m}^{pred}(n)=x_m+jy_m \quad (23b)$$

This gives a metric in the form:

$$M_{ab}(n) = \left[\frac{I^2+Q^2}{2}\right] + \left[\frac{x_m^2+y_m^2}{2}\right] - Re\{e^{j\pi a/2}[(x_mI+b_mQ)+j(y_mI-a_mQ)]\} \quad (24)$$

With four possible values for a and four values for b, there are 16 such metrics to be determined. However, intermediate computations can be shared between the 16 computations, reducing complexity significantly. First, the magnitude squared of the data term can be computed:

a) Compute: $p=I^2+Q^2$

Then, for $m=0, 1, 2,$ and 3, the following can be used to compute the metrics efficiently:

b) $q = \dfrac{p+x_m^2+y_m^2}{2}$ c) sum=$x_mI+y_mQ$
d) dif=$x_mQ-y_mI$
e) Compute the following four metrics $M_{0b}(n) = q - $ sum     $M_{2b}(n) = q + $ sum $M_{1b}(n) = q - $ dif     $M_{3b}(n) = q - $ dif where
$b = (a+m) \bmod 4$ Thus, by expanding the metric and sharing computations, branch metrics can be computed in an efficient manner using the predicted target reference values. Note that step a) may be omitted and p ignored in step b). Also, for better equalization and soft information, it may be desirable to divide all 16 metrics by an estimate of the noise power, where noise is any impairment, such as thermal noise and/or interference, Such an estimate can be obtained from the metrics themselves or from the error signal used in reference tracking. If noise estimates are not used in the metric process, they may still be used when forming the soft information. The noise estimate may vary with each time sample or it may be constant for blocks of time samples, for example, for a TDMA burst. Soft information can be extracted from the equalizer using techniques given in U.S. Pat. No. 5,099,499, which is incorporated herein by reference.

Also in the first step, it may be desirable to use weighted predicted reference values, where the weight is a real number between 0 and 1. Such weighting provides better equalizer performance when the reference values are noisy, which is the case when the weight estimation process is corrupted by noise or decision feedback errors. The optimal weighting value for a noisy target value is the magnitude squared of the noiseless target value divided by the sum of the magnitude squared of the noiseless target value and the power of the noise on the noisy target value. In practice, approximations to these quantities can be used, or a set of fixed weighting values can be used. One practical solution is to weight the predicted reference value by a weight that depends on the magnitude or magnitude squared of the predicted reference value.

In the second step, which also occurs in the Viterbi equalizer 3, the state with the best accumulated metric is determined. For the form of the metric used above, this corresponds to the smallest metric. Then, the predecessor states associated with this state are determined. How this is determined depends on how the Viterbi equalizer is implemented. If it is implemented according to U.S. patent application Ser. No. 07/894,933, which is incorporated herein by reference, then the symbol history gives the predecessor information in the form of symbols. However, it is also possible to indicate predecessor information with the use of pointers, as discussed in C. M. Rader, "Memory management in a Viterbi decoder," *IEEE Trans. Commun.*, vol. COM-29, pp. 1399–1401, Sep. 1981. In this case, these pointers would be used to determine the past states, which correspond to initially detected symbols.

In the third and fourth steps, which occur in the target value tracker 4, a rotated error signal is computed and used in updating the reference target and delta values. Alternatively, one could use a nonrotated error signal and express the update in terms of the nonrotated value. Also, one can trade off complexity versus performance by updating only a subset of the reference values. The error signal in the third step may be computed as an intermediate step in computing the branch metric, which can be viewed as a magnitude squared error. If the target values change very slowly, the delta reference values may be omitted. If the target values change very quickly, additional reference values may be desired, where these reference values model higher order derivatives in the target values.

Initialization of the reference values can be done using synchronization information and possible training over a synchronization field. Initialization using the conventional tracking form is discussed in U.S. patent application Ser. No. 07/942,270, entitled "A method of forming a channel estimate for a time-varying radio channel". One approach is to use this form of initialization, train the conventional channel taps over the synchronization field, then convert the conventional channel taps into reference target values and reference delta values for use in data equalization. A second approach is to first convert synchronization information into initial reference target values and set reference delta values to zero. Then, training of the reference values is performed one or more times over the synchronization field.

More specifically, the first approach is to initialize and train channel tap estimates and channel tap derivative estimates over the known synchronization field, then convert these to reference target values for use in tracking over the data field. For example, the synchronization process involves correlating the received data with a known synchronization pattern. Once symbol timing is determined, the correlations are the initial estimates of the channel taps, $c_{0,init}$ and $c_{1,init}$. The initial channel tap derivative estimates can be set to zero. Training involves updating the initial values as if the synchronization field were being demodulated. This means using the updating equation 14 with $s_{est}(n)$ and $s_{est}(n-1)$ being the known synchronization symbols. These updated values can then be mapped to reference target values and reference delta values according to the relations:

$$Z_{0m} = c_{0,est}^* e^{j\pi m/2} + c_{1,est}^*$$

$$D_{0m} = d_{0,est}^* e^{j\pi m/2} + d_{1,est}^*$$

These reference values would then be tracked and used for data demodulation.

For the second approach, the synchronization correlation values, which are the $c_{0,init}$ and $c_{1,init}$ values, are used to give initial target values according to:

$$Z_{0m,init} = c_{0,init} e^{j\pi m/2} + c_{1,init}^*$$

$$D_{0m,init} = 0$$

Then, these values would be updated and tracked as if the synchronization field were being demodulated. This means that the decided values $s_k$ and $s_p$ would be known values.

In some applications, known sequences may not be transmitted. This gives rise to the blind equalization problem. Blind equalization may also be performed using a Viterbi equalizer structure, as discussed in N. Seshadri, "Joint data and channel estimation using fast blind trellis search techniques," Globecom '90. The present invention may be used with this structure, in which case the reference values may be initialized to zero at the start of data demodulation.

In another embodiment of the present invention, there is a set of reference values stored for each of the states in the Viterbi equalizer. In U.S. Pat. No. 5,164,961, which is incorporated herein by reference, a set of channel taps have been stored for each state in the equalizer. By storing reference values per state, an update decision delay d is not necessary. After the state accumulated metrics have been updated, each set of references is updated based on the state it is associated with and the predecessor states associated with that state. As disclosed in the original application, the reference values used for different states do not need to correspond to the same symbol hypotheses. For example, $Z_{0m}$ and $D_{0m}$ reference values could be stored for state 0, but $Z_{1m}$ and $D_{1m}$ reference values could be stored for state 1. Because there is no update delay, separate predicted reference target values are unnecessary. Also, the delta reference values may be omitted if the rate of adaptation is high enough.

The set of reference values associated with the updated states depends on the predecessor state selected. For example, if updated state 0 has predecessor state 1, then the $Z_{1m}$ and $D_{1m}$ reference values associated with predecessor state 1 would now become associated with updated state 0. These values would be rotated to become $Z_{0m}$ and $D_{0m}$ reference values.

Depending on the number and location of synchronization or other known data fields, the equalization may be performed forwards in time, backwards in time, both directions, i.e., bidirectional equalization, or various combinations thereof. All the preferred embodiments may be used in conjunction with such equalization strategies. These strategies are described in the following documents: allowed U.S. patent application Ser. No. 07/965,848, which is incorporated herein by reference; U.S. Pat. No. 5,182,749; Y. Kamio and S. Sampei, "Performance of reduced complexity DFE using bidirectional equalization in land mobile communication," *Proc. 42nd IEEE Veh. Technol. Conf.*, Denver, Colo. 1992, pp. 372–375; Y. -J. Liu, M. Wallace, and J. W. Ketchum, "A soft-output bidirectional decision feedback equalization technique for TDMA cellular radio," *IEEE J. Sel. Areas Commun.*, vol. 11, pp. 1034–1045, Sep. 1993; H.

Suzuki, "Performance of a new adaptive diversity-equalization for digital mobile radio," *Electron. Lett.*, vol. 26, pp. 626–627, 1990.

The present invention can also incorporate two receive polarizations. If only one polarization was transmitted, then there are reference values for each receive polarization. If two polarizations are used in transmission, then there are reference values corresponding to combinations of symbols sent on one polarization and symbols sent on another polarization.

The present invention can also incorporate diversity reception, such as antenna diversity, where diversity combining is performed within the equalization process. Such a technique is described with conventional channel tracking in U.S. Pat. No. 5,191,598, which is incorporated herein by reference. In the present invention, there would be different sets of reference values, one set for each diversity channel. However, there would be only one Viterbi equalizer, which would add branch metrics formed from the different diversity channels. Initial detection information would be provided to the target value tracker, which would update references for all the antennas based on different error signals for each antenna.

The present invention can also take the form of a fractionally-spaced equalizer. In this case, the equalizer receives multiple data streams corresponding to different synchronization timings. These can be viewed as diversity channels and treated in the same manner as previously described for diversity combining within the equalizer.

While the preferred embodiments are based on a particular channel tracking algorithm, other channel tracking algorithms can also be mapped to direct update forms. These include algorithms are described in a) L. Lindborn, *Adaptive equalization for fading mobile radio channels*. Licentiate Thesis, Dept. of Technology, Uppsala University, Sweden, Nov. 1992, and b) A. P. Clark and S. Hariharan. "Adaptive channel estimator for an HF radio link," *IEEE Trans. Commun.*, vol. 37, pp. 918–926, Sep. 1989.

While the preferred embodiments are for a QPSK constellation, the present invention is not restricted to such a constellation. Other modulations and constellations can also be used. For example, $\pi/4$-shift DQPSK can be demodulated without removing the $\pi/4$ shift. This gives rise to a time varying constellation, with 4 values for even symbol periods and 4 different values for odd symbol periods. Reference values can be determined for even and odd periods. Because of symmetry properties, the number of reference values can be kept low.

Finally, the Viterbi equalizer may use a sequence estimation algorithm other than the Viterbi algorithm. For example, the M-algorithm may be used.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

We claim:

1. A radio receiver for demodulating digital information comprising:

means for receiving radio signals and processing them to produce data samples;

means for storing reference values that model what the receiver should receive for various transmitted symbol sequence hypotheses;

means for equalizing said data samples using said stored reference values to produce symbol detection information; and means for updating said reference values based on said symbol detection information.

2. A radio receiver according to claim 1, wherein said means for receiving radio signals includes a plurality of antennas, and said means for equalizing the received data combines branch metrics associated with said plurality of antennas.

3. A radio receiver according to claim 1, wherein said means of equalization is a fractionally-spaced equalizer.

4. A radio receiver according to claim 2, wherein said means of equalization is a fractionally-spaced equalizer.

5. A radio receiver according to claim 1, wherein said reference values are maintained for each state within the equalizer.

6. A radio receiver according to claim 1, wherein said means for receiving radio signals includes a plurality of polarizations, and said means for equalizing the received data combines branch metrics associated with said plurality of polarizations.

7. A radio receiver according to claim 1, wherein said symbol detection information includes soft information.

8. A radio receiver according to claim 1, wherein said equalization includes scaling metrics by an estimate of the noise power.

9. A radio receiver according to claim 1, wherein said equalization includes weighting said reference values by weighting values.

10. A radio receiver according to claim 1, wherein said equalization is performed using bidirectional equalization.

11. A radio receiver according to claim 1, wherein said equalization is performed using blind equalization.

12. A method for equalizing a received sample, comprising the steps of:

storing a plurality of reference values that correspond to unequalized expected receive sample values for different transmitted symbol sequence hypotheses;

predicting a plurality of reference values using said reference values to produce a plurality of predicted reference values;

forming branch metrics that correspond to magnitude squared differences between said received samples and said predicted reference values;

forming accumulated metrics using said branch metrics;

producing detected symbol values using said accumulated metrics;

using said detected symbol values to select one of said reference values; and using said selected reference value to update one or more of said plurality of reference values.

13. A method according to claim 12, wherein said predicted reference values are weighted.

14. A method for demodulating digital information comprising the steps of:

receiving radio signals and processing them to produce data samples; storing reference values that estimate the received values for various transmitted symbol sequence hypotheses:

equalizing the received dam using said stored reference values to produce symbol detection information; and updating said reference values based on said symbol detection information.

\* \* \* \* \*